United States Patent [19]
Mitsui et al.

[11] Patent Number: 5,889,570
[45] Date of Patent: Mar. 30, 1999

[54] REFLECTION—TYPE LIQUID CRYSTAL DISPLAYING DEVICE

[75] Inventors: Seiichi Mitsui, Kashiwa; Kenichi Iwauchi, Funabashi, both of Japan

[73] Assignee: Sharp Kabushiki Kaisha, Osaka, Japan

[21] Appl. No.: 767,978

[22] Filed: Dec. 17, 1996

[30] Foreign Application Priority Data

Dec. 18, 1995 [JP] Japan ..................................... 7-328862

[51] Int. Cl.⁶ ........................ G02F 1/1333; G02F 1/1335
[52] U.S. Cl. ........................ 349/113; 349/112; 349/114; 349/84
[58] Field of Search ..................................... 349/112, 113, 349/114, 84

[56] References Cited

U.S. PATENT DOCUMENTS

| | | | |
|---|---|---|---|
| 3,837,729 | 9/1974 | Harsch ..................................... | 350/160 |
| 3,846,014 | 11/1974 | Adrich et al. ............................ | 349/113 |
| 3,910,681 | 10/1975 | Elliott et al. ............................. | 349/114 |
| 4,088,400 | 5/1978 | Assouline et al. ....................... | 349/112 |
| 4,436,377 | 3/1984 | Miller ...................................... | 349/114 |
| 4,456,336 | 6/1984 | Chung et al. ............................ | 350/338 |
| 4,492,432 | 1/1985 | Kaufmann et al. ...................... | 350/338 |
| 5,402,324 | 3/1995 | Yokoyama et al. ..................... | 349/112 |
| 5,548,425 | 8/1996 | Adrich et al. ............................ | 349/113 |

FOREIGN PATENT DOCUMENTS

| | | |
|---|---|---|
| 0 464 499 A2 | 1/1992 | European Pat. Off. . |
| 362223724 A | 10/1987 | Japan ..................................... 349/113 |
| 04314522 A | 11/1992 | Japan . |
| 405034685 A | 2/1993 | Japan ..................................... 349/113 |
| 7-114 013 | 5/1995 | Japan . |

OTHER PUBLICATIONS

Koizumi, et al. "Reflective Multicolor LCD (II): Improvement in the Brightness." Proceedings of the SID, vol. 29/2, 1988, at 157–60.

*Primary Examiner*—William L. Sikes
*Assistant Examiner*—Julie Ngo
*Attorney, Agent, or Firm*—David G. Conlin; George W. Neuner

[57] ABSTRACT

A reflection-type liquid crystal displaying device includes an optically transmitting first substrate on which an optically transmitting electrode is at least formed; an anisotropic scattering/reflecting plate for performing a function of anisotropically scattering an incident light and a function of reflecting a light; and a liquid crystal layer disposed between the optically transmitting first substrate and the anisotropic scattering/reflecting plate. The obtained reflection-type liquid crystal displaying device exhibits an extremely bright, uniform, and good displaying capability.

12 Claims, 10 Drawing Sheets

Region where no voltage is applied (A)  Region where a voltage is applied (B)

Region where no voltage is applied (A)  Region where a voltage is applied (B)

REFLECTION—TYPE LIQUID CRYSTAL DISPLAYING DEVICE

BACKGROUND OF THE INVENTION

1. Field of the Invention

The present invention relates to a reflection-type liquid crystal displaying device that can be applied to various displaying apparatuses

2. Description of the Related Arts

Liquid crystal displaying devices consume less electric power than TV cathode-ray tubes since liquid crystal displaying devices employ a non-light-emitting method in which external light is modulated. Also liquid crystal displaying devices exhibit an excellent property that they are thin and light, suitable for application to flat panel displaying apparatuses. Therefore, by utilizing these features, liquid crystal displaying devices are now used for displaying apparatuses such as watches, electronic calculators, computer terminals, notebook-type computers, and word processors. Further, liquid crystal displaying devices are now used for displaying in television receivers instead of cathode ray tubes and, at present, they are used for various application fields.

A well-known representative display mode for modulating the light intensity by utilizing liquid crystals in a liquid crystal displaying device is what is called a TN (Twisted Nematic) mode in which the orientation of the liquid crystal molecules in a liquid crystal cell is twisted by about 90° as initial orientation. In the TN mode, liquid crystal cells are disposed between a pair of polarizing plates, and black-and-white display is realized by utilizing the optical properties of the liquid crystal cells (namely, the rotatory power exhibited when no voltage is applied and dissolved when a voltage is applied).

In liquid crystal displaying devices of a simple matrix driving type, an STN (Super Twisted Nematic) mode is widely adopted. The STN mode utilize a cell structure which is similar to that of the TN mode and in which the twisted angle of the liquid crystal molecules are set to be within the range from 180° to 270°. In the STN mode, a sharp change in the orientation state of the liquid crystal molecules in accordance with the increase in applied voltage is reflected to change in birefringence (double refraction) of the liquid crystal by setting the twisted angle of the liquid crystal to be more than 90° and further optimizing the set angle of the polarizing direction of the polarizing plates, thereby realizing an electro-optical property having a sharp threshold value. Accordingly, the STN mode can provide an electro-optical property having a sharp threshold voltage and, hence, is suitable for liquid crystal displaying devices of a matrix driving type. However, the STN mode has a disadvantage that the background of the display turns yellowish green or dark navy-blue due to birefringence of the liquid crystal. For reducing the above disadvantage, a liquid crystal displaying device has been developed in which black-and-white display is provided by color correction. The color correction is performed by superposing an optical compensating panel or a phase difference plate formed of a polymer such as polycarbonate on the STN liquid crystal display panel.

In a liquid crystal color displaying device having such a structure, multi-color display or full-color display is realized by additive color mixture by providing, for example, three-dot (red, green, and blue) micro color filters of minute dimension for each display pixel within a liquid crystal cell. However, these display modes have a disadvantage that the view angle is narrow due to the use of a polarizing plate and also, in principle, the display will be extremely dark because half of the incident light is not utilized for the display. Therefore, these display modes could not be applied to reflection-type liquid crystal displaying devices.

Accordingly, for use which requires brightness, a reflection-type liquid crystal display mode that is supposed to have a good prospect is what is called a guest-host mode in which a pigment (a dichroic pigment) having two different light absorptivities with respect to longitudinal and lateral directions of the pigment molecule is added to liquid crystals without using a polarizing plate. These guest-host modes may be classified into a Heilmeier type which uses a polarizing plate (See G. H. Heilmeier et al. Appl. Phys. Lett., 13, pp. 91, 1968), a White/Taylor type which does not use a polarizing plate (phase transition type: See D. L. White et al. Appl. Phys. Lett., 25,683, 1974), a two-layer type (See T. Uchida, Proc. SID, 22, pp. 41, 1981), and others. The principle of operation in these types of display modes is the same. Namely, the principle of operation in the guest-host mode is that the orientation of a pigment molecule is controlled via the orientation of the liquid crystal molecules by applying a voltage so that the difference in light absorptivity with respect to the direction of the pigment molecule may be reflected to the display.

Another method for providing a color display in the guest-host mode involves utilizing a pigment which absorbs visible light of a certain wavelength. In addition to this, there is proposed in Tohru Koizumi et al. Proceedings of the SID Vol. 29/2, pp. 157, 1988 a reflection-type liquid crystal color displaying device in which guest-host cells utilizing a black pigment are combined with a micro color filter. This article discloses a method of manufacturing a reflecting plate for a reflection-type liquid crystal color displaying device, the reflecting plate having an optimal reflection property by a control of the irregularity (unevenness) of the reflecting surface. This method employs subjecting a glass substrate to surface roughening treatment with a polishing agent, varying the time for etching the substrate with hydrofluoric acid so as to control the irregularity of the substrate surface, and forming a thin Ag film on the irregular surface to complete the reflecting plate.

However, in the above method of fabricating a reflecting plate for a reflection-type liquid crystal color displaying device, the glass substrate surface is damaged by a polishing agent for forming the irregular portion, so that it is not possible to form an irregular portion having a uniform shape with good reproducibility. Therefore, it is extremely difficult to provide a uniform reflection property with good reproducibility by such a reflection-type liquid crystal displaying device obtained by using a reflecting plate fabricated to have an ununiform irregularity formed on the glass substrate.

SUMMARY OF THE INVENTION

The present invention has been made in view of solving the above-mentioned problems and the purpose thereof is to provide a reflection-type liquid crystal displaying device having an extremely bright, uniform, and good displaying capability.

The present invention provides a reflection-type liquid crystal displaying device comprising: an optically transmitting first substrate on which an optically transmitting electrode is at least formed; an anisotropic scattering/reflecting plate for performing a function of anisotropically scattering an incident light and a function of reflecting a light; and a liquid crystal layer disposed between the optically transmitting first substrate and the anisotropic scattering/reflecting plate.

DETAILED DESCRIPTION OF THE PREFERRED EMBODIMENTS

Figure 1:
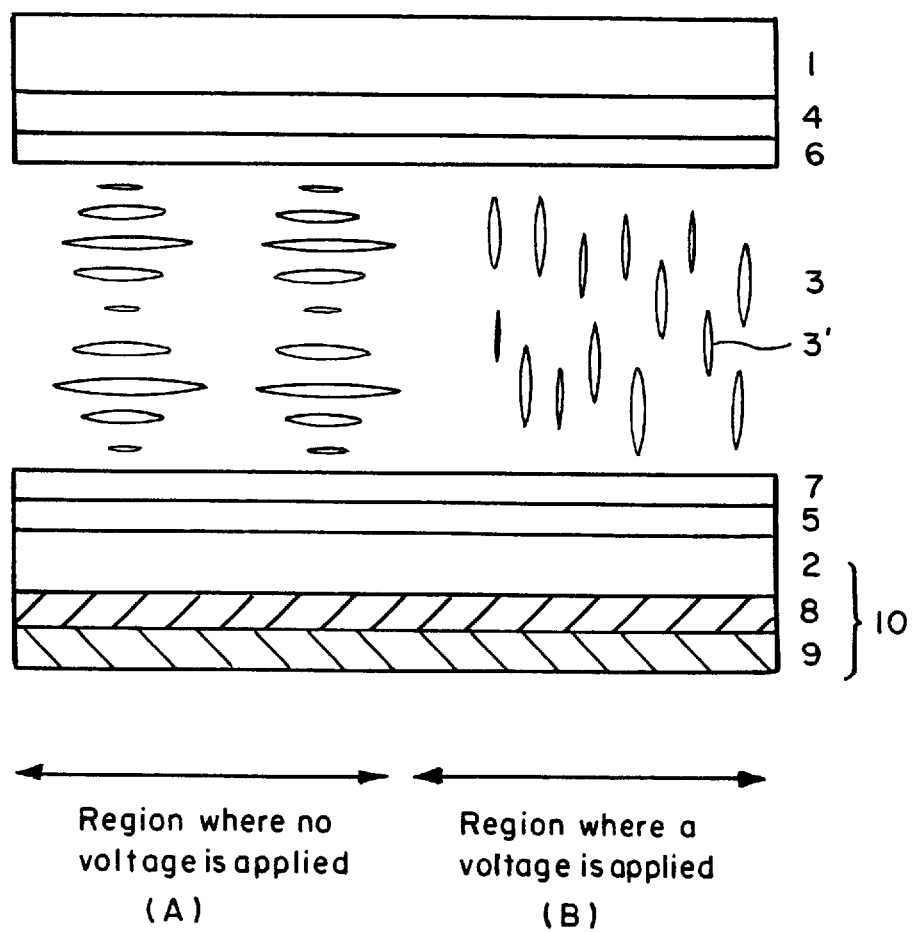
FIG. 1 is a schematic cross-sectional view showing a structure of a reflection-type liquid crystal displaying device according to the first and second embodiments of the present invention.

According to the first aspect of the present invention, the reflection-type liquid crystal displaying device comprises: an optically transmitting first substrate on which an optically transmitting electrode is at least formed; an anisotropic scattering/reflecting plate for performing a function of anisotropically scattering an incident light and a function of reflecting a light; and a liquid crystal layer disposed between the optically transmitting first substrate and the anisotropic scattering/reflecting plate.

According to the first aspect of the present invention, an anisotropic scattering/reflecting plate performing a function of anisotropically scattering an incident light and a function of reflecting a light is utilized, so that it is possible to determine the reflection property because of the characteristics of the anisotropic scattering/reflecting plate and to control the reflection property of the reflecting plate more easily when compared with the conventional reflecting plate which utilizes the irregular shape of the reflection-type liquid crystal displaying device. Accordingly, it is possible to realize a reflection-type liquid crystal displaying device having an extremely bright, uniform, and good displaying capability.

According to the second aspect of the present invention, the anisotropic scattering/reflecting plate comprises: an anisotropic scattering film for anisotropically scattering the incident light; a reflecting film for reflecting the incident light transmitted through the anisotropic scattering film; and a second substrate, the anisotropic scattering film and the reflecting film being formed on the second substrate.

Since the anisotropic scattering film and the reflecting film can be disposed in the interior of the liquid crystal cell, namely, between the substrate and the liquid crystal layer, there will be no parallax in displaying, so that it is possible to realize a reflection-type liquid crystal displaying device suitable for performing a hyperfine display or a color display by cell partition.

According to the third aspect of the present invention, the anisotropic scattering/reflecting plate comprises: an anisotropic scattering film for anisotropically scattering the incident light; a reflecting film for reflecting the incident light transmitted through the anisotropic scattering film; and a second substrate, the second substrate being interposed between the anisotropic scattering film and the reflecting film.

According to the fourth aspect of the present invention, the reflection-type liquid crystal displaying device comprising: an optically transmitting first substrate; an anisotropic scattering film formed on the first substrate for anisotropically scattering an incident light; an optically transmitting electrode formed on the first substrate or on the anisotropic scattering film; a reflecting plate including a second substrate and a reflecting film formed on the second substrate, the reflecting film reflecting the incident light transmitted through the anisotropic scattering film; and a liquid crystal layer disposed between the optically transmitting first substrate and the reflecting plate.

The anisotropic scattering film that can be used for the present invention may be a film which is disclosed in Japanese Laid-open Patent Publication (Kokai) No. HEI 4(1992)-314522. Namely, the anisotropic scattering film comprises a transparent matrix material in which a transparent substance having an anisotropic shape and a refractive index different from that of the transparent matrix material is homogeneously dispersed in an orderly manner so that the substance particles may be arranged parallel to each other. The transparent matrix material may be selected from a wide group of transparent materials including, for example, olefin resins, acrylonitrile resins, styrene resins, acrylic ester resins, polyester resins, polyamide resins, polycarbonate resins, cellulose resins, polyurethane resins, and silicone resins.

The transparent matrix material and the transparent substance having an anisotropic shape are not compatible with each other and have different refractive indices. The difference of refractive indices between the transparent matrix material and the transparent substance having an anisotropic shape should be at least 0.0001 and, preferably, more than 0.01. The anisotropic shape may be, for example, a spheroid, a rectangular parallelepiped, an intermediate shape between these two, or a circular cylinder. The transparent substance having an anisotropic shape may be selected from inorganic substances such as various kinds of fillers, pigments, and fibers in addition to organic substances such as the resins similar to the one used for the above-mentioned transparent matrix material.

The anisotropic scattering film has an optical property such that the film is transparent by scattering only the light incident in the front direction facing the film but transmits the light incident in an angle grater than a certain specific value. Therefore, since such an anisotropic scattering film is utilized, it is possible to control the reflection property of the reflecting plate in the reflection-type liquid crystal displaying device easily, thereby achieving a reflection-type liquid crystal displaying device having an extremely bright, uniform, and good displaying capability.

According to the fifth aspect of the present invention, the reflecting film in the reflection-type liquid crystal displaying device comprises a metal film.

Since a metal film is used as a reflecting film in the present invention, it is possible to form the metal film on the anisotropic scattering film by an ordinary film-formation technique such as vapor deposition, so that the anisotropic scattering/reflecting plate can be fabricated in a simple manufacturing process with good reproducibility, thereby reducing the costs for manufacturing the reflection-type liquid crystal displaying device. Moreover, when a metal reflecting film is used in a reflection-type liquid crystal displaying device in which the anisotropic scattering/ reflecting plate is disposed between the substrate and the liquid crystal layer, the reflecting film can also serve to act as a displaying electrode, thereby reducing the processes and costs for manufacturing the reflection-type liquid crystal displaying device.

According to the sixth aspect of the present invention, the reflecting film in the reflection-type liquid crystal displaying device comprises a dielectric mirror film.

Since a dielectric mirror film is used as a reflecting film in the present invention, it is possible to control the wavelength of the reflected light, so that a color display can be performed in the reflection-type liquid crystal displaying device.

EXAMPLES

Preferred embodiments of the present invention will now be described, by way of example only, with reference to the accompanying drawings, in which:

FIG. 1 is a schematic cross-sectional view showing a structure of a reflection-type liquid crystal displaying device according to the first embodiment of the present invention. Referring to FIG. 1, the reflection-type liquid crystal displaying device includes a liquid crystal layer 3 disposed between a transparent substrate 1 and a transparent substrate 2 which are optically transmitting substrates arranged at predetermined intervals. The liquid crystal layer 3 contains guest-host liquid crystals obtained by mixing a black pigment 3' with a liquid crystal material.

On the inside of the transparent substrate 1 and the transparent substrate 2 are formed a transparent electrode 4 and a transparent electrode 5, respectively, which are optically transmitting electrodes patterned in a stripe-like shape corresponding to display pixels. On the transparent electrode 4 and the transparent electrode 5 are formed a liquid crystal orientation film 6 and a liquid crystal orientation film 7, respectively, made of for example polyimide by printing method or the like. On the outside of the liquid crystal cell is disposed an anisotropic scattering/reflecting plate 10 comprising the transparent substrate 2, an anisotropic scattering film 8, and a reflectiong film 9. The anisotropic scattering film 8 and the reflecting film 9 are formed on the outside surface of the transparent substrate 2.

In the first embodiment, LUMISTEE MFV 2525 manufactured by Sumitomo Chemical Company, Limited in Japan was used as the anisotropic scattering film 8. The anisotropic scattering/reflecting plate 10 was formed by depositing an Al metal film as the reflecting film 9 on the back side of the scattering film 8 by vacuum vapor deposition. The metal film used as the reflecting film 9 may be a metal film made of Ni, Cr, Ag, or the like instead of Al. The thickness of the reflecting film 9 is suitably 0.01 to 1.00 $\mu$m. As shown above, the anisotropic scattering film of this embodiment can be formed by an extremely simple process. The anisotropic scattering film 8 of the present invention is not limited to this embodiment alone.

The optical properties of the anisotropic scattering film 8 and the anisotropic scattering/reflecting plate 10 used in the first embodiment will now be described.

Figure 2:
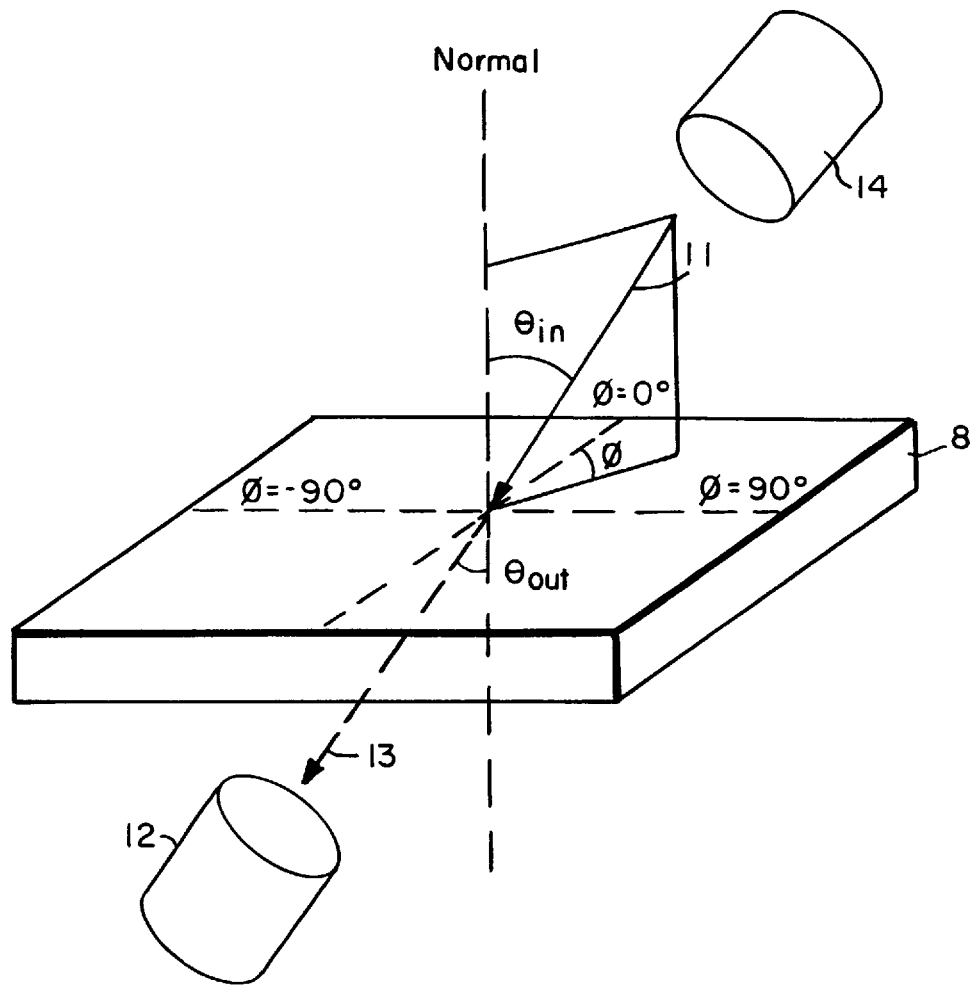
FIG. 2 is a view for briefly explaining the measurement of optical transmitting property of the anisotropic scattering film used in the first to sixth embodiments of the present invention.

The measurement of the optical transmittance of the anisotropic scattering film 8 is conducted by detecting, with a photomultimeter 12, a scattered light 13 obtained when an incident light 11 from a light source 14 is transmitted through the anisotropic scattering film 8, as shown in FIG. 2. In other words, the incident light 11 is allowed to impinge on the anisotropic scattering film 8 at an angle (incidence angle) $\theta$ in with respect to the normal of the anisotropic scattering film 8 and at a rotation angle (in-surface angle) $\phi$ in the film surface; and the photomultimeter 12 is disposed on a line which passes through the point of incidence of the incident light 11 impinging on the anisotropic scattering film 8. The optical transmitting property of the anisotropic scattering film 8 is determined by measuring the intensity of the scattered light 13 from the anisotropic scattering film 8 according as the incidence angle $\theta$in and the in-surface angle $\phi$ of the incident light 11 are varied. The following results of measurement were obtained under the condition that the incidence angle $\theta$in was equal to the exiting angle $\theta$out ($\theta$in=$\theta$out).

Figure 4:
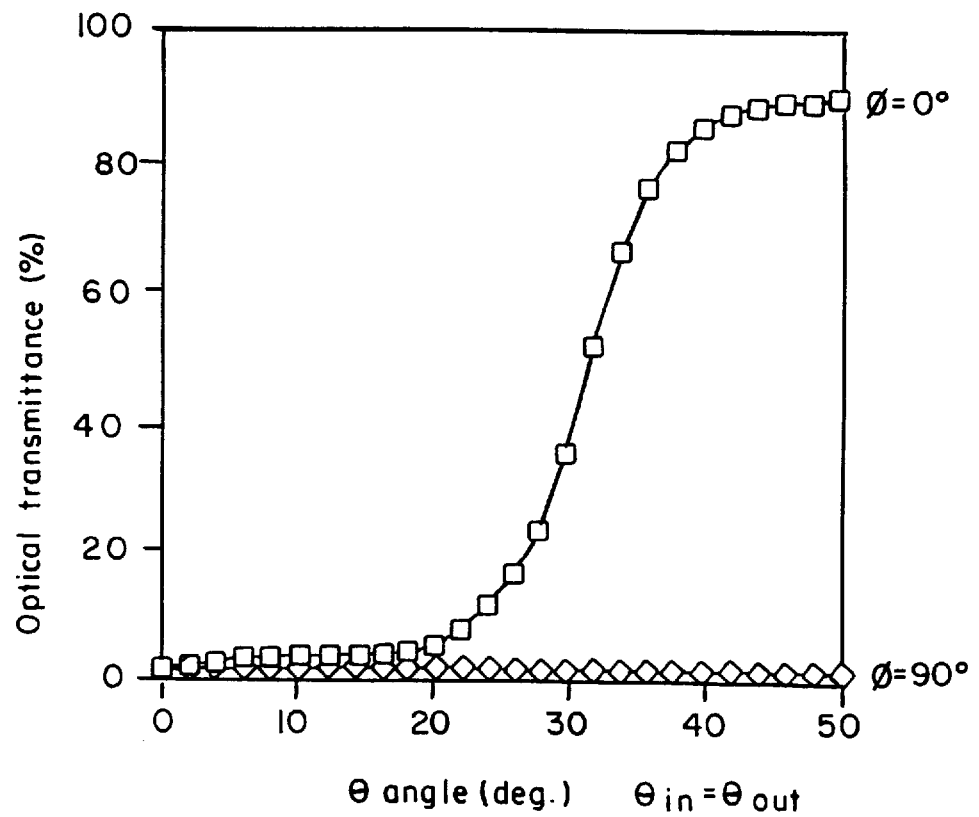
FIG. 4 is a view showing a result of measurement of optical transmitting property of the anisotropic scattering film used in the first to sixth embodiments of the present invention.

FIG. 4 shows a result obtained by measuring the optical transmitting property of the anisotropic scattering film of the first embodiment. It will be appreciated from FIG. 4 that the anisotropic scattering film exhibits opaqueness by scattering the incident light if the angle of incidence is within ±25 degrees from the front direction, and is transparent if the angle of incidence is more than ±25 degrees.

Figure 3:
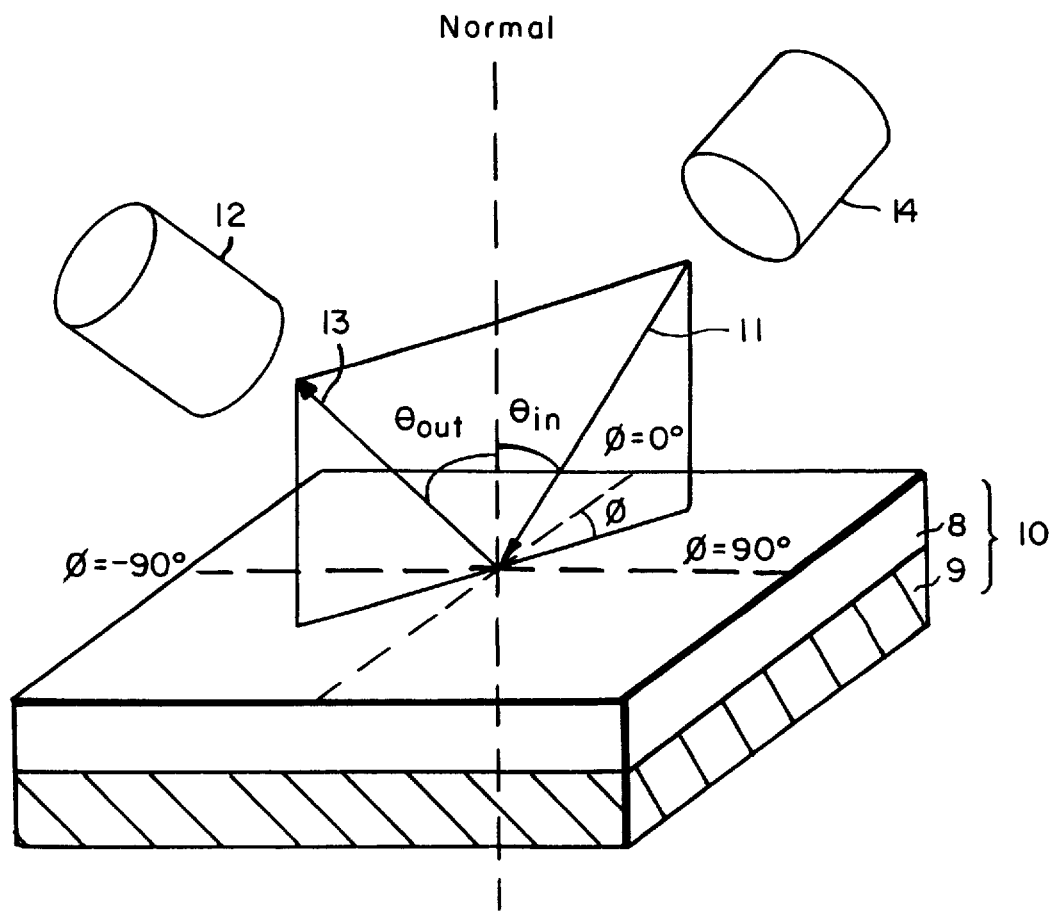
FIG. 3 is a view for briefly explaining the measurement of optical reflecting property of the anisotropic scattering/reflecting plate used in the first embodiment and the reflection-type liquid crystal displaying device of the first embodiment.

On the other hand, the measurement of the optical reflectance of the anisotropic scattering/reflecting plate 10 is conducted by detecting, with a photomultimeter 12, a scattered light 13 obtained when an incident light 11 from a light source 14 is reflected by the anisotropic scattering/reflecting plate 10, as shown in FIG. 3. In other words, the incident light 11 is allowed to impinge on the anisotropic scattering/ reflecting plate 10 at an angle (incidence angle) $\theta$in with respect to the normal of the anisotropic scattering/reflecting plate 10 and at a rotation angle (in-surface angle) $\phi$in the scattering/reflecting plate surface; and the photomultimeter 12 detects the intensity of the scattered light 13 obtained when the incident light 11 is reflected at a reflection angle $\theta$out by the anisotropic scattering/reflecting plate 10. The optical reflecting property of the anisotropic scattering/ reflecting plate 10 is determined by measuring the intensity of the scattered light 13 from the anisotropic scattering/ reflecting plate 10 according as the incidence angle θin, the reflection angle θout, and the in-surface angle φ of the incident light 11 are varied. Here, a standard white plate (magnesium oxide) was used as a reference (100%) for reflection property curves.

Figure 5:
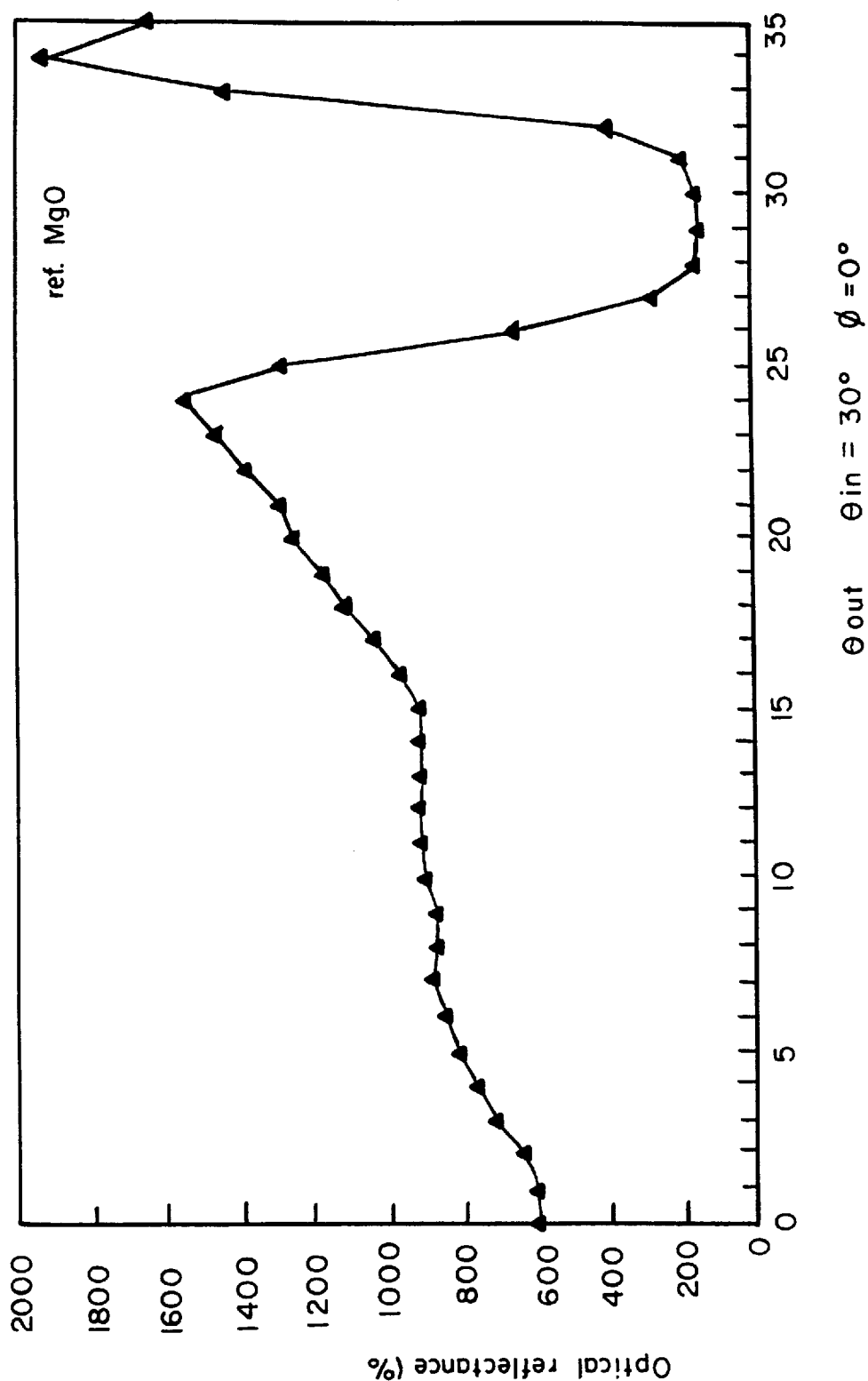
FIG. 5 is a view showing a result of measurement of optical reflecting property (dependence on the reflection angle $\theta$out, $\theta$in=30°, $\phi$=0°) of the anisotropic scattering/reflecting plate used in the first embodiment of the present invention.
Figure 6:
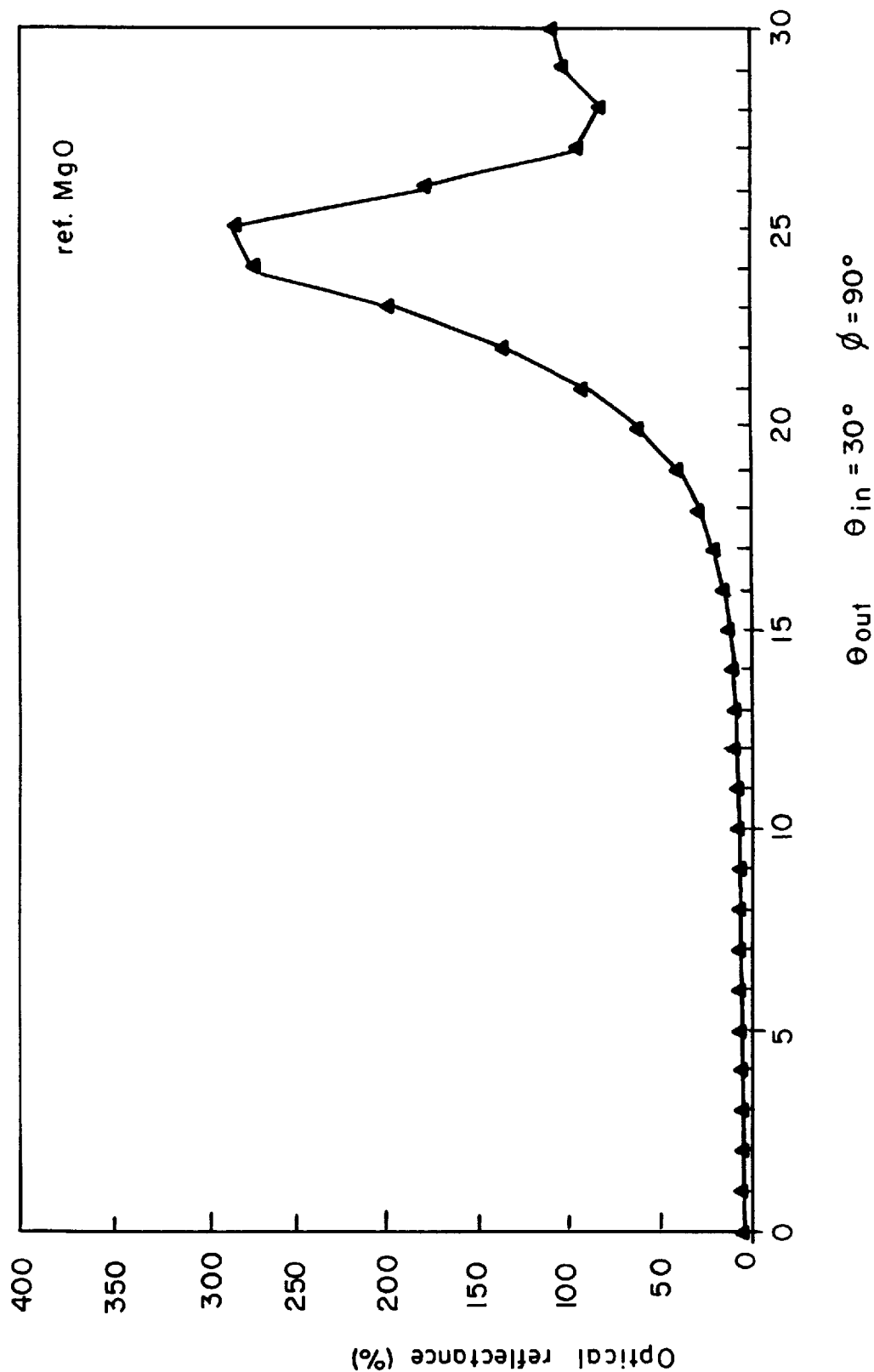
FIG. 6 is a view showing a result of measurement of optical reflecting property (dependence on the reflection angle $\theta$out, $\theta$in=30°, $\phi$=90°) of the anisotropic scattering/reflecting plate used in the first embodiment of the present invention.

FIG. 5 to FIG. 8 show results obtained by measuring the optical reflecting property of the anisotropic scattering/reflecting plate of the first embodiment. First, FIG. 5 and FIG. 6 show results obtained by measuring the dependence of the reflectance on the reflection angle θout when the in-surface angle φ is 0° and 90°, respectively, by varying the reflection angle θout with the incidence angle θin being fixed at 30°. The dependence of the reflectance on the reflection angle θout of the anisotropic scattering/reflecting plate as understood from FIG. 5 and FIG. 6 shows a reflection property such that the reflectance attains its maximum at a angle shifted by 5° to 7° from the regular reflection direction and sharply decreases if the reflection angle exceeds the above angle. Also, FIG. 6 shows that the reflectance of the anisotropic scattering/reflecting plate depends largely on the in-surface angle φ. It has been confirmed that the reflection property when the incident angle θin is 0° is identical to the one when the incident angle θin is 180°, and the reflection property when the incident angle is 90° is identical to the one when the incident angle θin is −90°.

These results suggest the following advantage of the present invention. The reflection property of the reflecting plate used in a conventional reflection-type liquid crystal displaying device was such that the reflectance attains its maximum in the regular reflection direction, so that the regular reflection from the liquid crystal panel surface was viewed by the observer, degrading the display quality. Moreover, owing to an attempt to gain brightness by narrowing the view angle, the change in brightness in accordance with the θ angle was drastic, so that it was not possible to achieve a display agreeable to be seen. On the other hand, according to the anisotropic scattering/reflecting plate of the present invention, the regular reflection image due to the liquid crystal panel surface is not viewed by the observer, so that the above-mentioned degradation of the display quality does not occur, thereby largely improving the display quality.

Figure 7:
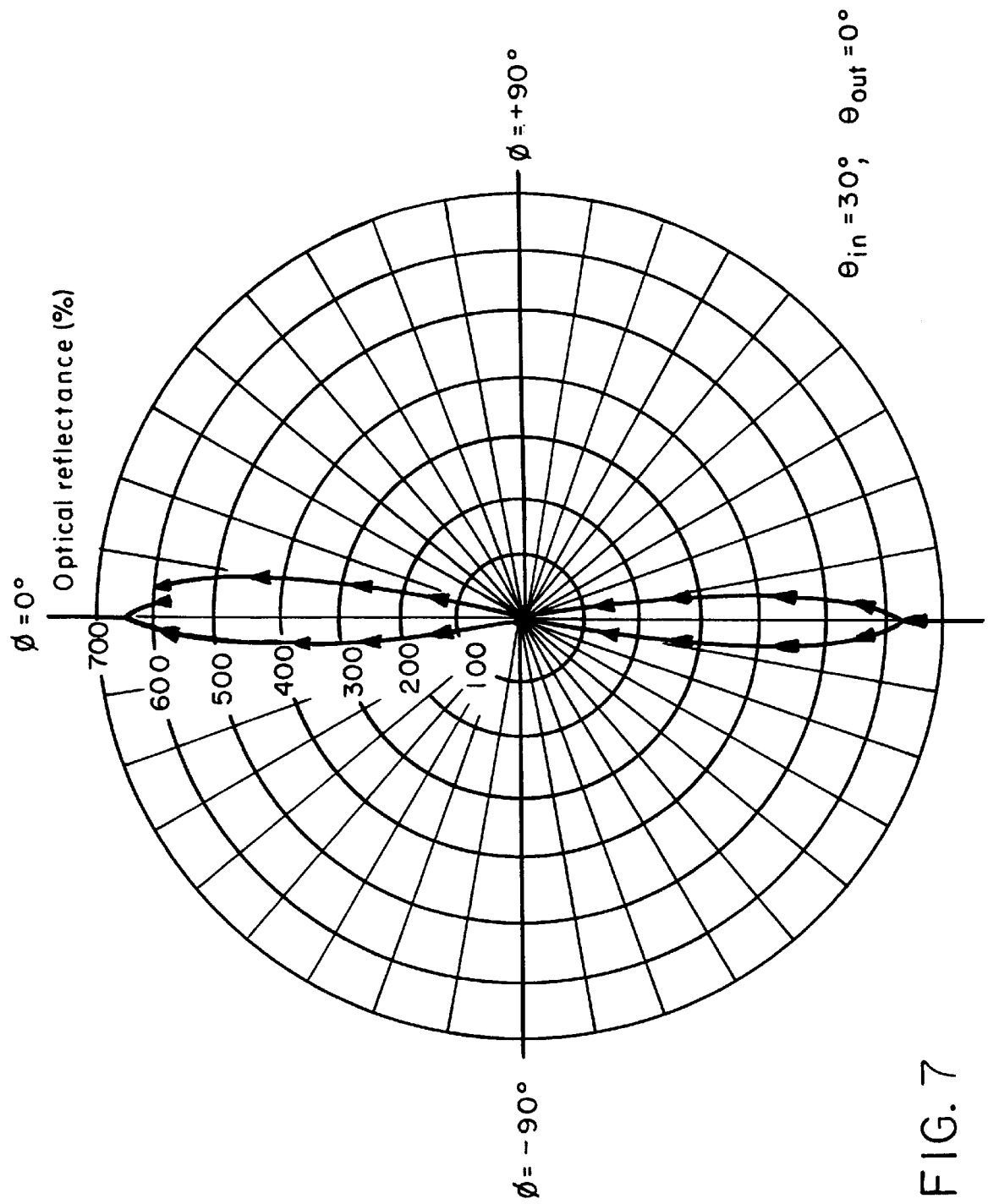
FIG. 7 is a view showing a result of measurement of optical reflecting property (dependence on the in-surface angle $\phi$, $\theta$in=30°, $\theta$out=0°) of the anisotropic scattering/reflecting plate used in the first embodiment of the present invention.

FIG. 7 shows the result obtained by measuring the dependence of the reflectance on the in-surface angle Ø when the incident angle θin is fixed at 30° and the reflection angle is fixed at 0°. Referring to FIG. 7, the concentric rings represent 100, 200, 300, 400, 500, 600, and 700% respectively from the smallest one to the largest one. It is understood from FIG. 7 that the anisotropic scattering/reflecting plate of the present invention can achieve a brightness which is 600% larger than the standard white plate used in the measurement. If a reflection-type liquid crystal displaying device is configured to include an anisotropic scattering/reflecting plate having such a reflection property, it is possible to effectively take out the reflected light in one direction. Namely, an extremely bright display (a reflection-type liquid crystal displaying device) can be achieved when it is observed by limiting the view angle with the in-surface angle being φ=0° in the anisotropic scattering/reflecting plate according to the first embodiment of the present invention. It has been confirmed that, by utilizing this anisotropic scattering/reflecting plate, it is possible to freely design the view angle of the reflection by controlling the scattering property of the anisotropic scattering film.

Next, a method for manufacturing a reflection-type liquid crystal displaying device having a structure shown in FIG. 1 will now be described.

Glass substrates 7059 (manufactured by Coning Glass Works Co., Ltd.) having a thickness of 1.1 mm were used as the transparent substrates 1, 2. On the transparent substrates 1, 2 were formed ITO films (indium oxide films) having a thickness of 1000 Å as the transparent electrodes 4, 5, respectively, by sputtering method. On the transparent electrodes 4, 5 was formed N,N-dimethyl-N-octadecyl-3-aminopropyltrimethoxysilyl chloride having a property of vertically orienting the liquid crystal molecules on the substrate surface as the liquid crystal orientation films 6, 7, respectively, by printing method.

Then, the transparent substrates 1, 2 having the transparent electrodes 4, 5 and the liquid crystal orientation films 6, 7 formed thereon were fixed with the substrate interval being 8 μm by utilizing a fiber glass (manufactured by Nippon Electric Glass Co., Ltd. in Japan) as a spacer. The interval between the transparent substrates 1, 2 is preferably within the range of 3 to 15 μm, more preferably 4 to 10 μm. This is because of the limitation that, if the interval is too small, insufficient absorption of light will occur in addition to the problem of manufacturing and, if the interval is too large, a delayed response will occur in addition to the increase in required driving voltage.

Subsequently, between the transparent substrates 1, 2 was inserted a liquid crystal layer 3 obtained by mixing an optically active substance (S811 manufactured by Merck Co., Ltd.) at 2.5 wt % into a guest-host liquid crystal (ZL12327 manufactured by Merck Co., Ltd.) having a black pigment 3' added thereto.

Finally, the anisotropic scattering film 8 and the reflecting film 9 were disposed on the outside surface of the transparent substrate 2 to complete the manufacturing of the reflection-type liquid crystal displaying device of this embodiment. Here, the present invention is not limited to the manufacturing method of this embodiment alone.

Next, the operation principle of the reflection-type liquid crystal displaying device manufactured thus according to the first embodiment of the present invention will now be described. The black pigment (dichroic pigment) 3' which is added to the liquid crystal layer 3 has a property of strongly absorbing a polarized component parallel to the longitudinal axis of the pigment molecule and absorbing only a small amount of vertical polarized component.

Referring to FIG. 1, the region (A) represents a state in which no voltage is applied. At this state, the dichroic pigment molecules form a helix approximately parallel to the transparent substrates 1, 2 along the liquid crystal molecules, whereby all the polarized components of the incident light are absorbed, since a chiral dopant has been added into the liquid crystal so that the liquid crystal layer 3 within the liquid crystal cell may have a planar orientation. Accordingly, when no voltage is applied, the white light incident into the liquid crystal cell is absorbed by the dichroic pigment, reaches the anisotropic scattering/reflecting plate 10, is reflected by the anisotropic scattering/reflecting plate 10, and is absorbed again by the dichroic pigment, thereby providing a dark state.

On the other hand, in FIG. 1, the region (B) represents a state in which a voltage is applied. At this state, the liquid crystal molecules and the pigment molecules are arranged vertical to the transparent substrates 1, 2 due to the dielectric anisotropy of the liquid crystal within the liquid crystal cell. Accordingly, almost all the incident light is, without being absorbed by the dichroic pigment, transmitted through the liquid crystal layer 3 and is reflected by the anisotropic scattering/reflecting plate 10 to exhibit the color of the anisotropic scattering/reflecting plate 10, thereby providing a bright state.

Evaluation of the property of the reflection-type liquid crystal displaying device according to the first embodiment as shown above will now be described. The evaluation was conducted in the same manner as the aforementioned measurement of the reflectance described by referring to FIG. 3. Specifically, the reflection-type liquid crystal displaying device of this embodiment was disposed at the position of the anisotropic scattering/reflecting plate 10 in FIG. 3, and the reflectivity was measured with respect to the light incident at an incident angle of θin=30° so as to determine the ratio of the intensity of the light scattered at the reflection angle of θout=0° (direction of the normal) by the reflection-type liquid crystal displaying device of this embodiment relative to the intensity of the light scattered at the reflection angle of θout=0° (direction of the normal) by the standard white plate. The result showed that the reflectance in the direction of the panel normal was about 200% with respect to the light incident at an incident angle of θin=30°, providing an extremely large brightness. The contrast ratio was 5.

As shown above, it has been confirmed that an extremely bright display can be obtained by utilizing the anisotropic scattering/reflecting plate of the present invention as a reflecting plate in a reflection-type liquid crystal displaying device.

Although the above first embodiment utilizes a guest-host liquid crystal display mode without using a polarizing plate for a liquid crystal layer, the present invention is not limited to this embodiment alone. The present invention can be applied to devices utilizing other display modes such as TNLCD, STNLCD, and ferroelectric liquid crystal displaying devices using a polarizing plate.

Next, the second embodiment of the present invention will now be described, in which a dielectric mirror made of stacked inorganic materials is used as the reflecting film 9 of the anisotropic scattering/reflecting plate 10 in FIG. 1 and in which a light absorbing layer (not shown) is further disposed on the back side of the dielectric mirror.

An interference filter was formed by alternately stacking two kinds of transparent inorganic dielectric thin films having different refractive indices as the dielectric mirror which is the reflecting film 9. In this embodiment, silicon dioxide (refractive index n=1.46) was used as a substance having a low refractive index and titanium dioxide (refractive index n=2.40) was used as a substance having a high refractive index. The interference filter was fabricated by forming a multi-layer film having two kinds of thin films alternately stacked by sputtering method utilizing a sputter target of silicon dioxide ($SiO_2$) and a sputter target of titanium dioxide ($TiO_2$).

Figure 8:
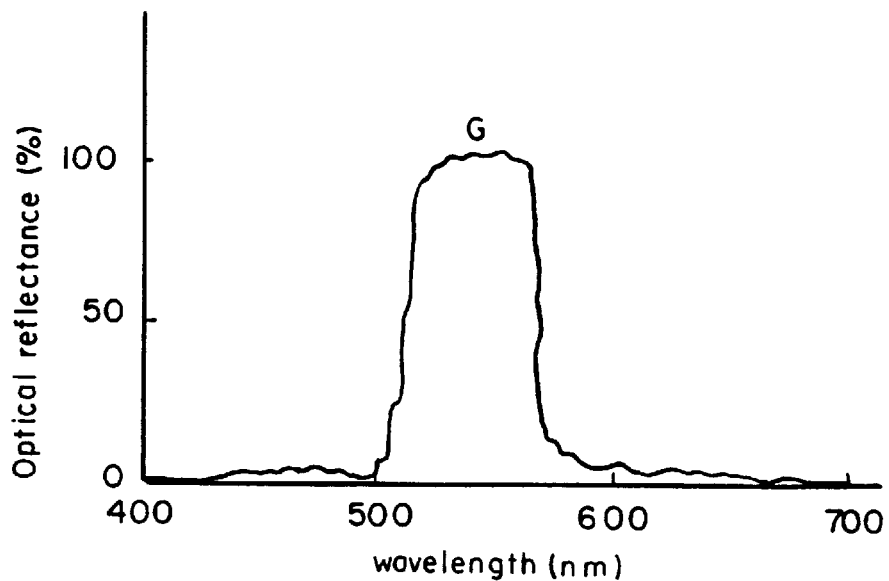
FIG. 8 is a view showing a result of measurement of optical reflecting property of the dielectric mirror which is a reflecting film used in the second embodiment of the present invention.

In this embodiment, the number of layers and the film thickness were optimized so that the interference filter may have a reflection property for green light. FIG. 8 shows the result of measurement of the reflection property. The film thickness of the interference filter was set to be 1.725 μm, and it is understood from FIG. 8 that a good reflected green light was obtained.

The light absorbing layer is disposed for absorbing the light which has been transmitted instead of being reflected by the dielectric mirror (interference filter). In this embodiment, fine carbon particles bound by a binder were formed on the back side of the transparent substrate 2 by printing method. The light absorbing layer may also be prepared by forming on the transparent substrate an organic coloring substance or a pigment bound by a binder by printing method or spinner method. Alternatively, a light absorbing sheet such as a black paper may be stuck onto the anisotropic scattering film 8 by an adhesive.

A reflection-type liquid crystal displaying device was fabricated by utilizing the anisotropic scattering/reflecting plate prepared as shown above. The device showed bright display in two colors (bicolor), namely, in green and black.

Although the above second embodiment shows an example of two-color display, the number of layers and the film thickness of the reflecting film may, alternatively, be optimized so that each of the pixels is divided into three dots for reflecting red, green, and blue lights. For example, the total film thickness of the interference filter may be set to be 1.052 μm in the case of blue light, 0.821 μm in the case of red light, and 1.725 μm in the case of green light. The reflecting film for red, green, and blue lights may be formed by repeating, for three times, the photoprocesses of applying, exposing, and developing a photoresist. Such a construction can achieve a multi-color display including red, green, and blue.

Also, although the second embodiment utilizes a dielectric mirror made of inorganic material, the present invention is not specifically limited thereto. It is possible to apply a holographic reflecting film made of organic material, a cholesteric liquid crystal film, or the like.

Next, the third embodiment of the present invention will now be described.

In the above first and second embodiments, the reflecting film 9 is formed on the outside of the liquid crystal cell. Accordingly, when the displaying device is observed aslant (at an angle), there will be a parallax in display due to the thickness of the transparent substrate 2 on the back side. This causes a great problem in performing a hyperfine display or a color display by pixel partition.

Figure 9:
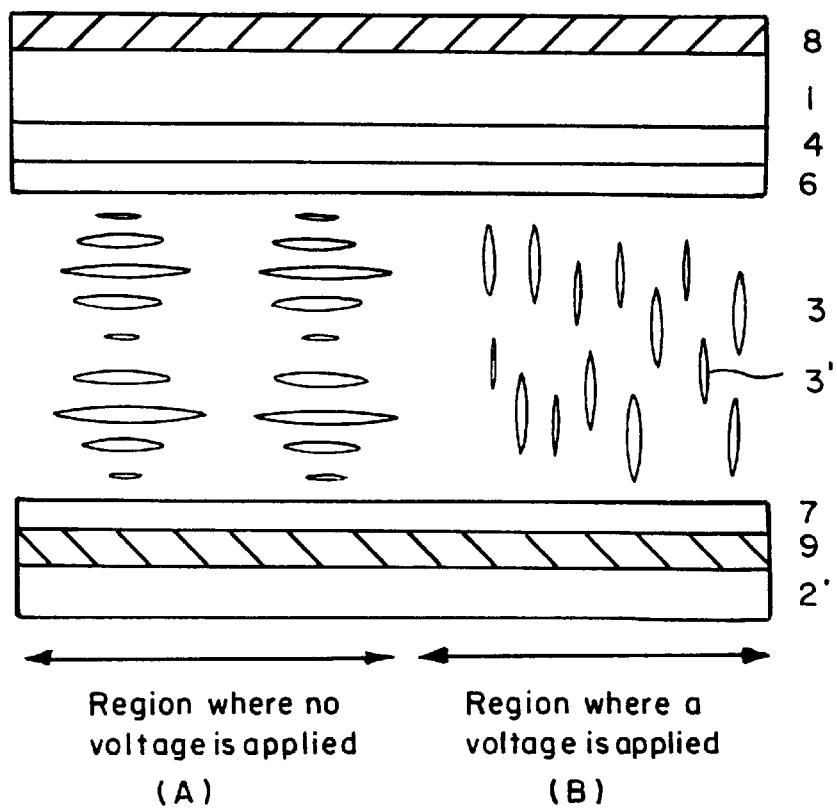
FIG. 9 is a schematic cross-sectional view showing a structure of a reflection-type liquid crystal displaying device according to the third embodiment of the present invention.

In order to solve the aforementioned problem, the third embodiment has a structure as shown in FIG. 9 such that the anisotropic scattering film 8 is disposed on the upper surface of the transparent substrate 1 and the reflecting film 9 is disposed on the inside of the substrate 2'. According to this embodiment, a metal reflecting film is used as the reflecting film 9, so that the reflecting film also acts as a display electrode, thereby eliminating the need for the transparent electrode 5 which is required in the first and second embodiments. Also, in the third embodiment, the substrate 2' corresponding to the transparent substrate 2 of the first and second embodiments need not be transparent and may be any substrate as long as the substrate can form a liquid crystal layer 3 by being disposed opposite to the transparent substrate 1.

It has been confirmed that the third embodiment can achieve a reflection-type liquid crystal displaying device showing no parallax and providing a displaying capability approximately equal to those of the first and second embodiments.

Next, the fourth embodiment of the present invention will now be described.

Figure 10:
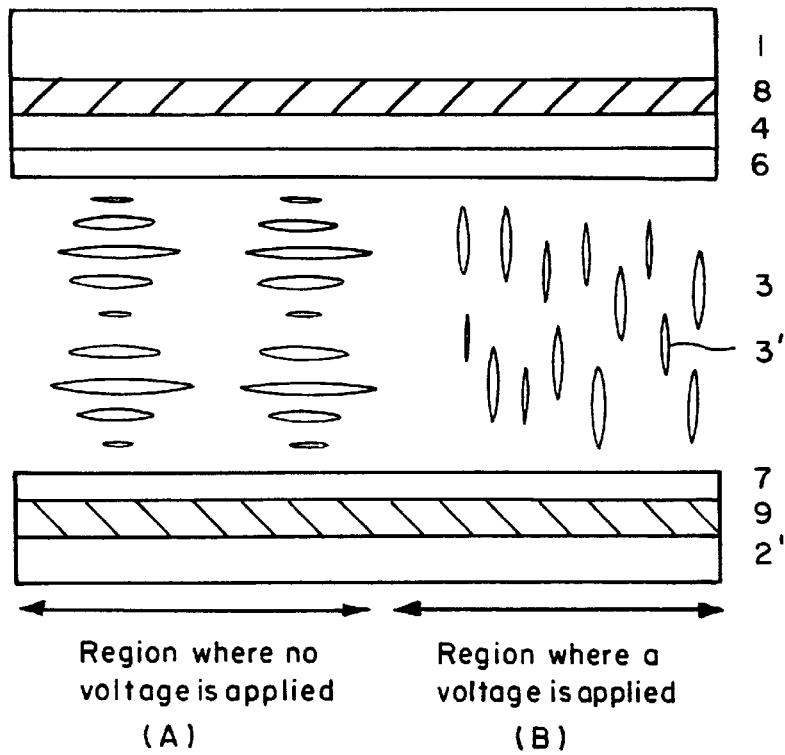
FIG. 10 is a schematic cross-sectional view showing a structure of a reflection-type liquid crystal displaying device according to the fourth embodiment of the present invention.

The construction of the fourth embodiment is the same as that of the third embodiment except that the anisotropic scattering film 8, which is disposed on the upper surface of the transparent substrate 1 in the third embodiment, is now disposed on the surface of the transparent substrate 1 facing the liquid crystal layer 3, as structurally shown in FIG. 10.

The reflection-type liquid crystal displaying device of the fourth embodiment has been recognized to have a property similar to that of the third embodiment in that it showed no parallax and provided a displaying capability approximately equal to those of the first and second embodiments.

Next, the fifth embodiment of the present invention will now be described.

Figure 11:
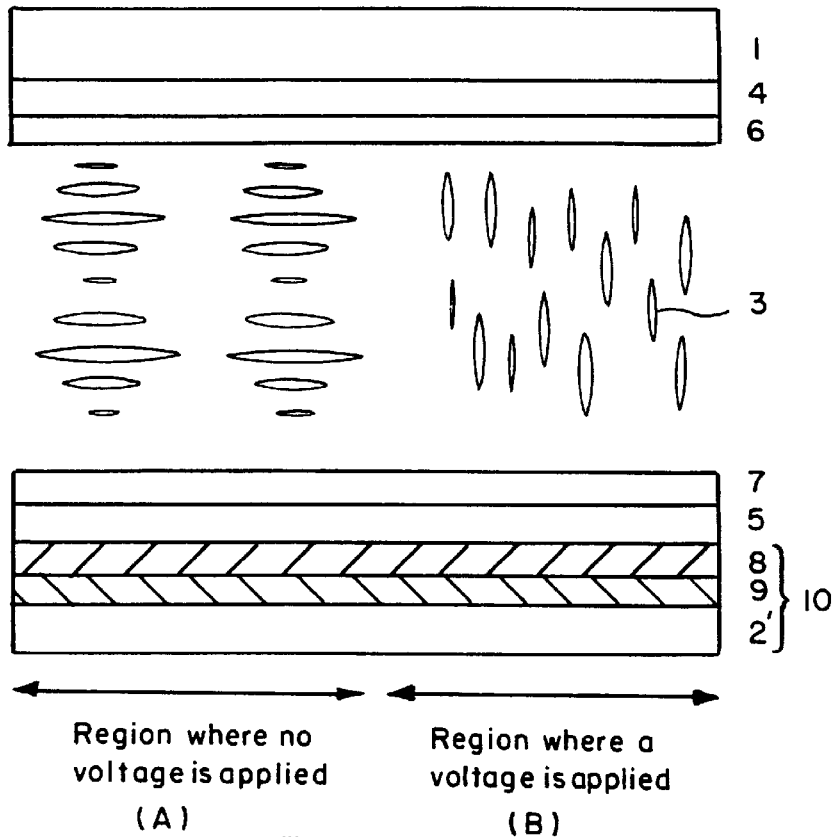
FIG. 11 is a schematic cross-sectional view showing a structure of a reflection-type liquid crystal displaying device according to the fifth embodiment of the present invention.

The construction of the fifth embodiment is the same as that of the first embodiment except that the anisotropic scattering/reflecting plate 10, which is disposed on the outside surface of the transparent substrate 2 in the first embodiment, is now disposed between the substrate 2' and the transparent electrode 5, as structurally shown in FIG. 11. In the fifth embodiment, the substrate 2' need not be transparent, either, and may be any substrate as long as the substrate can form a liquid crystal layer 3 by being disposed opposite to the transparent substrate 1.

The reflection-type liquid crystal displaying device of the fifth embodiment has been recognized to have a property similar to those of the third and fourth embodiments in that it showed no parallax and provided a displaying capability approximately equal to those of the first and second embodiments.

Conventional reflection-type liquid crystal displaying devices of the prior art involve problems that the cell thickness will be irregular due to the height of the projected portion in the irregularity and that, because of this, the orientation of the liquid crystal will be irregular if the metal thin film on the scattering/reflecting plate having the irregularity is disposed on a liquid crystal layer side, namely, at a position approximately adjacent the liquid crystal layer. On the other hand, since no irregularity is formed in the present invention, the cell thickness will be constant, causing no problem that the liquid crystal orientation will be disturbed, even if the anisotropic scattering/reflecting plate is disposed at a position approximately adjacent the liquid crystal layer, as in the third embodiment.

Next, as the sixth embodiment of the present invention, a reflection-type liquid crystal color displaying device provided with a color filter layer will now be explained.

Figure 12:
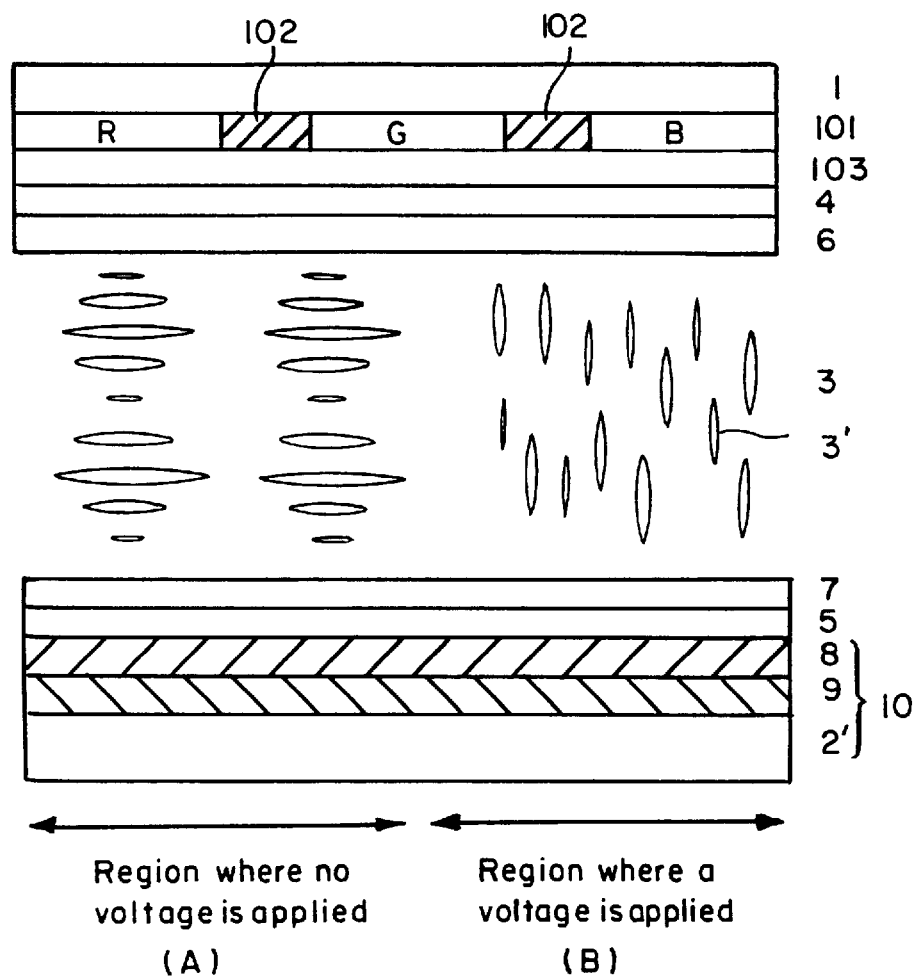
FIG. 12 is a schematic cross-sectional view showing a structure of a reflection-type liquid crystal displaying device according to the sixth embodiment of the present invention.

The sixth embodiment has a structure shown in FIG. 12 in which a color filter layer 101 and a planarizing layer 103 are disposed between the transparent substrate 1 and the transparent electrode 4 of the fifth embodiment shown in FIG. 11. The color filter layer 101 includes red, blue, and green color filters for each pixel and, further, black masks 102 are provided between the color filters. The reflection-type liquid crystal color displaying device having such a structure can be easily fabricated, and it has been confirmed that the displaying capability of the device is similar to those of the first to fifth embodiments in that an extremely bright and good display can be obtained. Although the above-mentioned sixth embodiment has a structure such that a color filter layer is further provided in the reflection-type liquid crystal displaying device of the fifth embodiment, the present invention is not specifically limited thereto. Other constructions, for example, a construction in which a color filter layer is provided in the reflection-type liquid crystal displaying device of one of the first to fourth embodiments, are also to be included within the scope of the present invention.

In the third to sixth embodiments, a dielectric mirror may be used as the reflecting film 9, as in the second embodiment. In such a case, however, it is necessary to prevent the unnecessary light transmitted through the dielectric mirror from being emitted to the displaying surface by, for example, providing a light-absorbing layer as in the second embodiment or by allowing the substrate to have a light-absorbing capability.

Here, although a phase-transition type guest-host mode was utilized as the display mode in the first to sixth embodiments, the present invention is not specifically limited thereto, but may be applied to other display modes. For example, the present invention can also be applied to a light-absorbing mode such as a two-layer guest-host mode, a light-scattering type display mode such as used in a polymer-dispersed LCD, and a birefringence display mode such as used in a ferroelectric LCD.

As shown above, according to the reflection-type liquid crystal displaying device of the present invention, it is possible to obtain an oriented reflection property owing to the construction utilizing the anisotropic scattering/reflecting plate and to realize a reflection-type liquid crystal displaying device having an extremely bright, uniform, and good displaying capability due to good reflection property of the reflecting plate.

What we claim is:

1. A reflection-type liquid crystal displaying device comprising:

at least one optically transmitting first substrate on which an optically transmitting electrode is formed;

an anisotropic scattering/reflecting plate for performing a function of anisotropically scattering an incident light and a function of reflecting a light; and a liquid crystal layer disposed between the optically transmitting first substrate and the anisotropic scattering/reflecting plate.

2. A reflection-type liquid crystal displaying device according to claim 1, wherein the anisotropic scattering/reflecting plate comprises:

an anisotropic scattering film for anisotropically scattering the incident light;

a reflecting film for reflecting the incident light transmitted through the anisotropic scattering film; and a second substrate, the anisotropic scattering film being formed on the second substrate and the reflecting film being formed on the anisotropic scattering film.

3. A reflection-type liquid crystal displaying device according to claims 2, wherein the reflecting film comprises a metal film.

4. A reflection-type liquid crystal displaying device according to claim 2, wherein the reflecting film comprises a dielectric mirror film.

5. A reflection-type liquid crystal displaying device according to claim 1, wherein the anisotropic scattering/reflecting plate comprises:

an anisotropic scattering film for anisotropically scattering the incident light;

a reflecting film for reflecting the incident light transmitted through the anisotropic scattering film; and a second substrate, the reflecting film being interposed between the anisotropic scattering film and the second substrate.

6. A reflection-type liquid crystal displaying device according to claim 1, wherein the anisotropic scattering film comprises a transparent film containing a transparent matrix material in which a transparent substance having a refractive index different from that of the transparent matrix material is dispersed so that the incident light can be anisotropically scattered.

7. A reflection-type liquid crystal displaying device according to claim 6, wherein the transparent substance has an anisotropic shape and is homogeneously dispersed in an orderly manner in the transparent film containing the transparent matrix material so that the substance particles are arranged parallel to each other.

8. A reflection-type liquid crystal displaying device according to claim 7, wherein the anisotropic shape of the transparent substance is a spheroid, a rectangular parallelepiped, or a circular cylinder.

9. A reflection-type liquid crystal displaying device according to claim 6, wherein the difference of refractive indices between the transparent matrix material and the transparent substance is at least 0.0001.

10. A reflection-type liquid crystal displaying device according to claim 6, wherein the transparent matrix material comprises a transparent resin.

11. A reflection-type liquid crystal displaying device comprising:

a liquid crystal display cell, a reflecting plate disposed behind the display cell, and an optical control film, disposed between the display cell and the reflection plate, for controlling reflection characteristics of the reflecting plate, wherein the optical control film is opaque for incident light with an incident angle within a predetermined value and is transparent for incident light with an incident angle more than the predetermined value, thereby uniformizing a displaying capability of the display cell.

12. A reflection-type liquid crystal displaying device according to claim 11, wherein the optical control film comprises an anisotropic scattering film including a transparent film containing a transparent matrix material in which a transparent substance different from the transparent matrix material in refractive index is homogeneously dispersed.

* * * * *